(No Model.) 2 Sheets—Sheet 1.
E. THOMSON.
ELECTRIC METER.
No. 416,350. Patented Dec. 3, 1889.
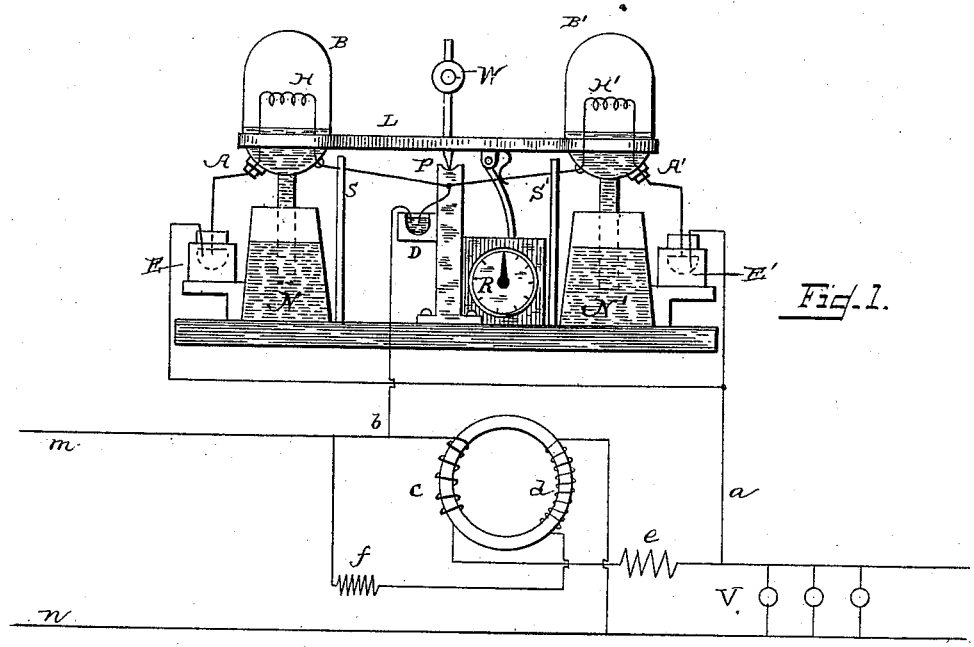
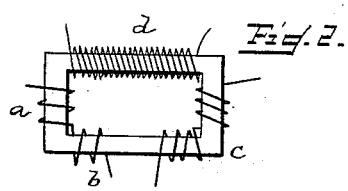
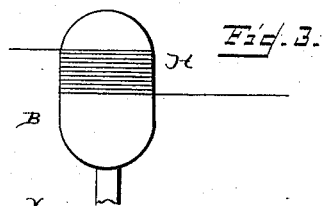
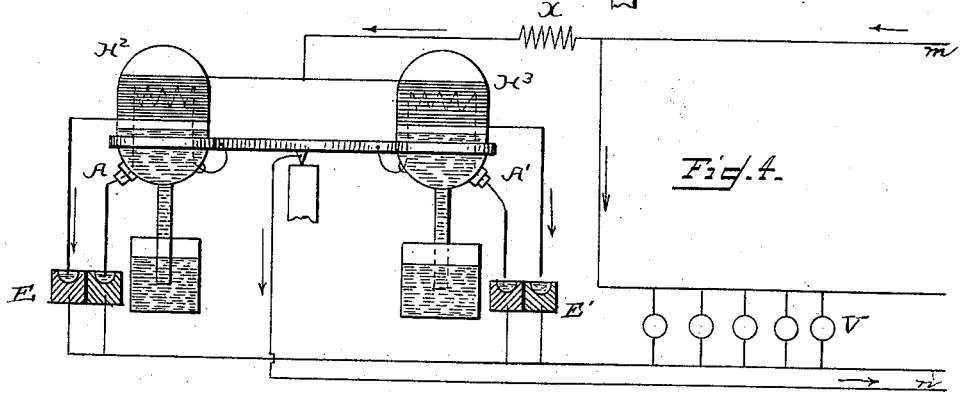
Witnesses
Ira R. Steward
Wm H. Capel
Inventor
Elihu Thomson
By his Attorney
H. C. Townsend (No Model.) 2 Sheets—Sheet 2.
E. THOMSON.
ELECTRIC METER.
No. 416,350. Patented Dec. 3, 1889.
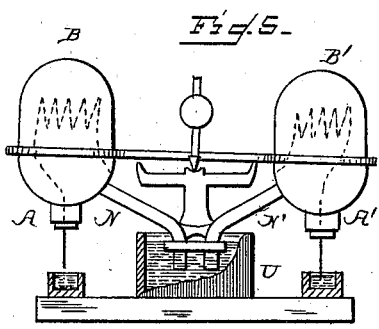
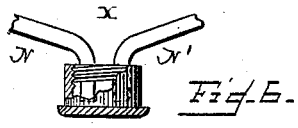
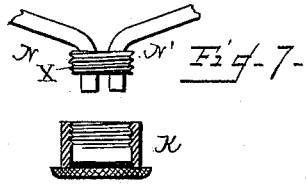
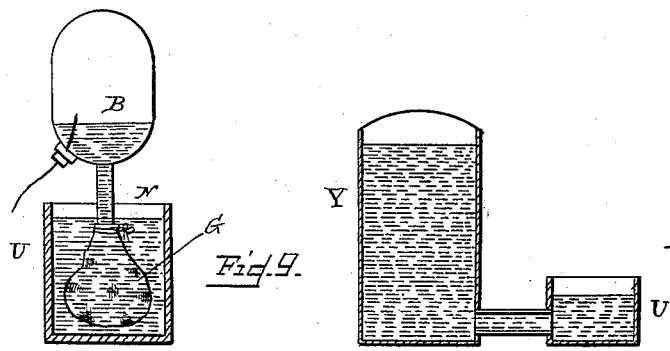
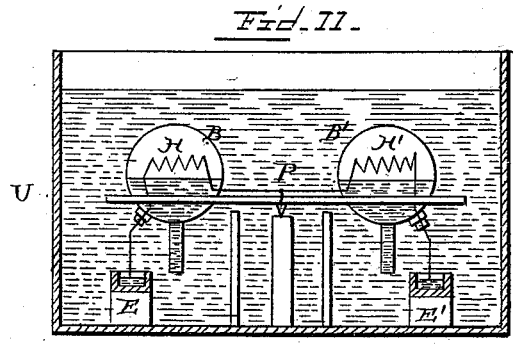
Witnesses
Ira R. Steward.
H. H. Capes
Inventor
Elihu Thomson
By his Attorney
H. C. Townsend

UNITED STATES PATENT OFFICE.

ELIHU THOMSON, OF LYNN, MASSACHUSETTS.

ELECTRIC METER.

SPECIFICATION forming part of Letters Patent No. 416,350, dated December 3, 1889.

Application filed April 8, 1889. Serial No. 306,388. (No model.)

*To all whom it may concern:*

Be it known that I, ELIHU THOMSON, a citizen of the United States, and a resident of Lynn, in the county of Essex and State of Massachusetts, have invented a certain new and useful Electric Meter, of which the following is a specification.

My invention relates to that class of electric meter or motor devices in which an expansible body or bodies of some fluid—such, for instance, as a gas or vapor heated at intervals by an electric heater—is employed as a means of producing movement in a pivoted or tilting structure.

My present invention consists, essentially, in employing the tension of a confined body of air, gas, or vapor, heated or put under tension by the heating effect of an electric current, as the direct force which imparts movement to the movable structure, which effect I accomplish by confining the gas or vapor in an inverted receptacle or chamber of any form carried by a movable support and dipping at its open lower end into a body of liquid which confines the gas or vapor in the receptacle under tension, leaving the chamber free to be raised by increased vapor tension against an opposing or balancing force whenever properly heated by the electric current.

Ordinarily I prefer to balance or oppose two bodies of the gas or vapor to one another by confining them in separate receptacles carried by a beam or lever fulcrumed between them. Two electric heaters are then employed and are thrown alternately into action by any suitable switch devices controlled by the movements of the beam or lever, so as to cause a continued oscillation of the same so long as electric current is supplied.

The liquid which seals the chambers or receptacles may be a high-test oil or other liquid not readily vaporizable or may be a vaporizable liquid if proper means be used to supply waste. The expansible fluid resting on top of said liquid in the chambers is preferably a gas or vapor of any kind. It may be air, or a vaporizable liquid may be employed, and the heaters used to generate vapor and increase the tension of such vapor in the chambers.

My invention consists, also, in the provision of an accessory or auxiliary heater for the meter, whereby it will be rendered more sensitive to small loads and will start more promptly into action when it is required to begin registering.

In the accompanying drawings, Figure 1 is a front elevation of a meter constructed in accordance with my present invention. Fig. 2 shows a form of converter that may be used in connection with the apparatus. Fig. 3 shows a way of applying the heating-coil. Fig. 4 shows the manner in which an auxiliary heater may be used in connection with a meter operating by the heating effects of an electric current. Fig. 5 is a modification in the relation of some of the parts. Figs. 6, 7, and 8 show details. Figs. 9 and 10 are modifications of details. Fig. 11 illustrates another modification.

In Fig. 1 at B B' are two vessels of thin sheet metal, glass, or other material, mounted on opposite ends of a beam L, supported on a fulcrum or pivot at P. The elongated lower ends of these chambers, in the form of necks or tubes N N', are open and dip into chambers or vessels supported independently of the vessels B B', and containing a fluid which seals the vessels B B' and prevents the escape of any fluid or gas in the upper part of the chambers. The contained fluid or gas, being lighter than the liquid which seals the chambers, rests on top of the liquid column in the necks N N', and when consisting of a gas or vapor is of course under tension normally insufficient to cause it to overcome the force of the outside air or gas pressure, which sustains the liquid column in the open inverted mouth of the chambers B B'. Within these receptacles B B', or otherwise applied to the same, are heating electric conductors H H', alternately put into circuit in consequence of a movement from side to side of the lever L and receptacles between the stops S S', which allow a small play back and forth of the lever and receptacles. One end of each heating-coil H H' is attached either to the metal receptacle itself or carried to the pivot, whereby electric connection is made. A mercury-cup may be employed with a wire dipping therein near or alongside the pivot for preserving a good connection with the stationary part of the apparatus from the lever L or from the common terminal of the heating-coils H H', while the free terminals of the heating-coils H H' pass out through insulated holes, at A A', or through a close cork set into a sort of neck made on the vessels B B'. These free ends extending outwardly pass down into mercury-cups E E', insulated from the frame and suitably mounted on the base of the apparatus or supported thereby. The cups E E' are electrically connected or attached to a wire $a$, leading from the circuit on which the meter is to be used, while the wire $b$ forms the other wire of the circuit, connected with the central contact or mercury-cup D. A register device R—such as a dial or set of dials—may be operated at every double swing of the lever L by suitable means, such as a pawl acting on a ratchet-wheel in the ordinary way.

The structure just described may be suitably attached to the circuit in various ways, one of which is shown in the figure, which is the same as that which is shown in a patent granted to me, No. 395,018, dated December 25, 1888. The wires $m$ $n$ are attached to the source of current for the lights—such as incandescent lights arranged in multiple at V— and the meter-wires $a$ $b$ are in shunt to a coil $c$, wound on the iron core, which also has a fine winding or pressure-winding $d$, connected in shunt from $m$ to $n$, in accordance with my patent referred to.

The operation is as follows: The system of chambers B B' have the air or gas originally partly driven out, so that they are partially filled with fluid and preferably to an equal degree. The system at this time must be so weighted as to have the property of being overset or being in unstable equilibrium— that is, it will rest on one side or the other on the stops S S', but will not remain in the center balanced. This can be effected by suitable adjustments at the center of gravity of the apparatus, and the condition of being in unstable equilibrium must be preserved throughout the whole range of operation of use of the meter, as when its coils H H' are heating by currents sent through them. The mercury-cups E E' are filled, so that just as the wire from A leaves the mercury the wire leading downward from A' enters the mercury in cup E', and vice versa, and the mercury in the cups is preferably covered with a layer of glycerine to avoid oxidation. At the start the wire leading from A dips into the mercury-cup E. The coil H is then in circuit and heats the air or gas around it, expanding the same and depressing the liquid column in the receptacle B. The effect of thus increasing the tension in the receptacle B is obviously to cause a stronger lifting action of the gas upon the receptacle B, after the manner of the gas in a gasometer, which lifting action is exerted against the influence of the overset-weight W, as well as against the influence of the gas or vapor in B', to a very slight extent, in so far as any movement tends to reduce the volume of gas therein by depressing the chamber and causing a rise in the liquid column in its neck. The buoyant effect of the liquid around the neck N also assists in the action to some extent, because as the liquid is driven out of the neck the level of the liquid around the same rises. The superior lifting action of the air or gas in B finally overcomes the opposing influences and lifts the chamber, so as to cause the lever to tilt to its other extreme position, cutting out the coil H and bringing into circuit the coil H'. The air in B' now expands and depresses the liquid column, forcing the fluid down into the vessels below it at N', while contraction is taking place on account of the cooling of the air in chamber B. Another shifting of the center of gravity now takes place, which results in the side B becoming heavier. These actions go on so long as the current is passed through the apparatus, and the oscillations are registered on the register R in the ordinary way. The uses of the devices shown and marked by the letters $c$ $d$ $e$ $f$ are the same as similar devices shown in my former patent referred to, and need not here be described, my present improvement relating to the use of the two bodies of gas or vapor confined by the two separate hydrostatic columns, depressed alternately by the expansion of fluid or gas above them, which independently changes their level or pressure. The accuracy of the register will depend upon the adjustments of the various parts.

The meter might be supplied with current, as indicated in Fig. 2, where an iron core is shown wound with three coils, one of which $a$ $b$ feeds the meter-line, while $c$ is in circuit with the lamps, and $d$ is a pressure-winding connected across the terminals of the lamps and feeding-wire. This arrangement is the subject of an application for patent filed by me March 5, 1889, No. 301,910.

Fig. 3 shows that the bulb or receptacle may have the heating-coil H wound upon the outside.

Fig. 4 shows a construction in which outside heating-coils $H^2$ $H^3$ are applied in addition to the internal heating-coil, (shown in dotted lines,) the outside coils being constructed of fine wire of considerable resistance, connected from one feeding-wire $m$, through the mercury-cups E E', to $n$, the other terminal. The resistance might be in the circuit mentioned, at a point outside of the coils. The mercury-cups thus receive not only the wires leading from the necks A A' from the interior of the receptacles, but also the terminals of the coils $H^2$ $H^3$, in shunt to the lamps or other translating devices. The interior coils are in series with the lamps, or fed in a circuit which is a branch around a coil in series with the lamps, or which is in inductive relation to a coil in series with the lamps, or one supplied with current in any other suitable way, while the coils $H^2$ $H^3$ are in a derived circuit around the lamps or are otherwise supplied, directly or indirectly, with energy from such circuit. As will be seen by tracing the circuits, the current circulating from $m$ through coil $H^2$ or $H^3$ passes, by the free terminal of such coil, through the mercury in the cup, and thence to the wire leading from the lamps V. The current from the lamps joins with that from the coils and passes through the other mercury-cup E or E', and thence, through the coil H or H', to the continuation $n$ of the circuit.

While the devices shown in connection with Figs. 1 and 2 are adapted only for use with alternating currents, the devices Fig. 4 may be used with continuous currents, since no induction arrangements are employed, but the currents are fed directly. The resistance X in the circuit with the coils $H^2$ $H^3$, when in use, should be high enough to prevent undue heating with the potential used. The object of the coils $H^2$ $H^3$ is to give a kind of accessory or initial impulse, tending to swing the connected limbs from side to side, so as to render the apparatus more sensitive to small loads or small currents in the main, or to make it start more promptly.

Fig. 5 shows a modification in which two tubes N N' are brought together in a single lower basin or receptacle U, the other parts of the apparatus remaining as before. This construction is preferred for its simplicity.

Figs. 6, 7, and 8 show how the tubes N N' may be closed during transportation, so as to retain in each limb B B' the proper amount of fluid.

In Fig. 7 the tubes are shown united by being passed through a small disk of metal X, which has a screw-thread cut on it and over which passes a screw-cap K, so as to close the ends of the tubes N N', a small leather washer being interposed. In setting up the apparatus this cap K is unscrewed while the ends of the vessels are immersed under the liquid. The liquid employed may be a rather high-test oil which does not evaporate or any other liquid not easily volatilized and preferably non-freezing. Where the necks are, as in Fig. 1, each provided with its own receptacle or dip down into liquid below independently of the other, the end of each tubular neck may have, as indicated in Fig. 9, a flexible cap of thin india-rubber G tied over the same, excluding the entrance of air and keeping the fluid in the chamber B. When this is entirely immersed in the outer vessel or stationary receiver U, the behavior is such as to be substantially the same as in Fig. 1, while the requisite amount of fluid is always imprisoned in B and subjected only to the contraction and expansion of the inclosed air. In cases where the vessel U, Fig. 5, and the receptacles B B' are supplied with a volatizable fluid, or a fluid which gradually passes off with the evaporation, as would be the case with water, the principle of the bird-fountain may be used to keep the supply up to a definite level. This is indicated in Fig. 10, where the reservoir Y is connected by a side passage to the vessel U. Should the fluid be evaporated to below the level of the upper part of the passage joining the two, it will be replenished at once from the larger vessel Y, which is closed above.

I have shown in Fig. 11 a modification which I have used with fair success, in which the whole apparatus is immersed in the fluid; or, in other words, the fluid is extended to cover the whole apparatus. The operation is substantially the same as in Fig. 1; but in the case of Fig. 11 the buoying power is practically invariable and the same at all times upon both chambers, and the lifting action of the contained gas sustained in the liquid column in the neck and pushing up against the interior of the chamber produces the tilting of the lever. It is obvious that in this instance the lever must be held down upon its fulcrum, owing to the tendency of both chambers to rise to the surface of the liquid by buoyancy, and that the tilting depends upon the difference in the tension of the gas or vapor in the two chambers or receptacles. The system is oscillatory, as before, and can be made to register. It will be seen that the expansion of air in one bulb in this case, as in the other, is entirely unhampered by anything occurring in the other bulb or receptacle.

What I claim as my invention is—

1. In an electric meter or motor device, a movable chamber or receptacle containing an expansible fluid, in combination with a hydrostatic column in its open lower end and sustained in a receptacle supported independently of said movable chamber or receptacle.

2. In an electric meter or motor, the combination, with two chambers or receptacles carried by a pivoted support and containing an expansible fluid, of a confining column of liquid carried in an independently-supported receptacle, electric heaters for the bodies of expansible fluid, and electric switch devices for throwing said heaters alternately into action, as and for the purpose described.

3. In an electric meter or motor device, the combination of two chambers moved oppositely by the tension of two bodies of contained gas or vapor, liquid columns retaining said bodies of gas or vapor and carried by a chamber or holder sustained independently of the chambers inclosing said bodies of gas or vapor, electric heaters for increasing the tension of the latter bodies in turn, and electric switch devices for throwing said heaters alternately into action, as and for the purpose described.

4. In an electric meter or motor device, the combination of two inverted chambers or receptacles dipping into bodies of liquid and each containing a gas or vapor, a beam or lever sustaining said chambers and fulcrumed between them, an electric heater for each chamber, and electric switch devices controlled by said beam or lever for throwing said switches alternately into action.

5. The combination, with an electric meter and the electric heating appliances by which the same is operated, of an auxiliary heater continually in operation for sensitizing the meter, as and for the purpose described.

6. The combination, with an electric meter, of an auxiliary sensitizing-heater supplied with energy from a branch constantly closed around the work while the meter is at rest.

7. The combination, with an electric meter and its alternately-acting heating-coils carrying electric energy varying in amount with the work, of auxiliary heating-coils carrying electric energy derived from a branch around the work and provided with auxiliary switching devices for throwing them alternately into action.

8. The combination, with a pivoted or tilting meter or motor device, of alternately-acting electric heaters carrying electric energy supplied from the main, and alternately-acting auxiliary heaters supplied with energy from a high-resistance branch or derived circuit around the work.

9. In an electric meter or motor, an inverted chamber or receptacle containing a gas or vapor and dipping at its lower end into a body of liquid, in combination with an electric heating device for increasing the tension of the gas or vapor, so as to produce movement of such chamber or receptacle.

Signed at Lynn, in the county of Essex and State of Massachusetts, this 1st day of April, A. D. 1889.

ELIHU THOMSON.

Witnesses:
J. W. GIBBONEY,
J. R. JOHNSON.